United States Patent
Wong et al.

(10) Patent No.: US 7,425,815 B2
(45) Date of Patent: Sep. 16, 2008

(54) MODULATION CHARGING CIRCUITRY FOR BATTERY CHARGING

(75) Inventors: Yoon Kean Wong, Redwood City, CA (US); Scott J. Davidson, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 155 days.

(21) Appl. No.: 11/130,637

(22) Filed: May 16, 2005

(65) Prior Publication Data

US 2006/0255767 A1 Nov. 16, 2006

(51) Int. Cl.
*H02J 7/04* (2006.01)
(52) U.S. Cl. .................. 320/141; 320/114; 320/123; 320/130; 320/133; 320/138; 320/139; 320/144; 320/145; 320/150; 320/155; 320/160
(58) Field of Classification Search ............... 320/114, 320/123, 130, 133, 138, 139, 141, 144, 145, 320/150, 155, 160
See application file for complete search history.

(56) References Cited

U.S. PATENT DOCUMENTS

| | | | | |
|---|---|---|---|---|
| 5,315,533 A | * | 5/1994 | Stich et al. | 700/298 |
| 5,945,811 A | * | 8/1999 | Hasegawa et al. | 320/141 |
| 6,160,389 A | * | 12/2000 | Watts | 323/282 |
| 6,184,654 B1 | * | 2/2001 | Bachner et al. | 320/114 |
| 6,696,922 B1 | * | 2/2004 | Wong et al. | 340/7.32 |
| 2005/0253560 A1 | * | 11/2005 | Popescu-Stanesti et al. | 320/138 |

* cited by examiner

*Primary Examiner*—Matthew V Nguyen
*Assistant Examiner*—Jue Zhang
(74) *Attorney, Agent, or Firm*—Fenwick & West LLP

(57) ABSTRACT

Circuitry for charging a battery includes a switch for coupling the power source to the battery. The switch is turned on and off in accordance with a periodic control signal including a plurality of periods. Each period includes a first duration during which the control signal is in a first state and a second duration during which the control signal is in a second state. The switch is turned on when the control signal is in the first state to couple the power source to the battery, and turned off when the control signal is in the second state to decouple the power source from the battery. Since the switch is periodically turned off while the battery is being charged, the average amount of heat generated by the switch is reduced, thereby preventing excessive thermal emission from the battery charging circuitry.

19 Claims, 3 Drawing Sheets

MODULATION CHARGING CIRCUITRY FOR BATTERY CHARGING

BACKGROUND OF THE INVENTION

1. Field of the Invention

The present invention relates to battery charging circuitry, and more specifically, to modulation charging circuitry for battery charging while reducing thermal emissions.

2. Description of the Related Art

Conventional battery charging circuits typically includes a battery charger IC (Integrated Circuit) that regulates the charging of the battery from a DC (direct current) power source. A conventional battery charger IC includes a switch that couples or decouples the DC power source to/from the battery. When the switch is on, the power source is coupled to the battery thereby charging the battery. When the switch is off, the power source is decoupled from the battery and thus the battery is not charged.

Conventional battery charger ICs typically receive a chip enable (CE) signal to enable or disable the battery charger IC. By keeping the CE signal asserted (either active high or active low), conventional battery charger ICs keep the switch turned on continuously while charging the battery. Thus conventional battery charger ICs require the CE signal to be maintained continuously while the battery is being charged. The CE signal is not asserted only when the battery is not being charged. For example, the conventional battery charger ICs turn the switch off when the battery is fully charged and thus no longer needs charging.

Since the turned-on switch has a small resistance (e.g., 0.2 ohm), the switch generates heat when the battery is charged. When the battery charger IC draws large amounts of current from a high current DC power adaptor, the heat generated by the switch in the battery charger ICs can cause thermal emissions which may be undesirable especially in small portable electronic devices with small size enclosures. The increase in thermal emissions leads to thermal stress on electronic components, which ultimately damages them or can lead to improper operation resulting in data loss or corruption.

Therefore, there is a need for circuitry and a method for charging batteries using a battery charger IC while preventing excessive thermal emissions.

SUMMARY OF THE INVENTION

The present invention provides circuitry and a method of charging a battery with a power source by modulating the on-times and off-times of a switch provided for coupling the power source to the battery. The switch is turned on and off in accordance with a periodic control signal that includes a plurality of periods, where each period includes a first duration during which the control signal is in a first state and a second duration during which the control signal is in a second state. The switch is turned on when the control signal is in the first state to couple the power source to the battery, and is turned off when the control signal is in the second state to decouple the power source from the battery.

An advantage of the battery charging circuitry and method in accordance with the present invention is that the switch coupling the power source to the battery is turned off periodically while the battery is being charged. Therefore, the average amount of heat generated by the switch is reduced, thereby preventing excessive thermal emission from the battery charging circuitry.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
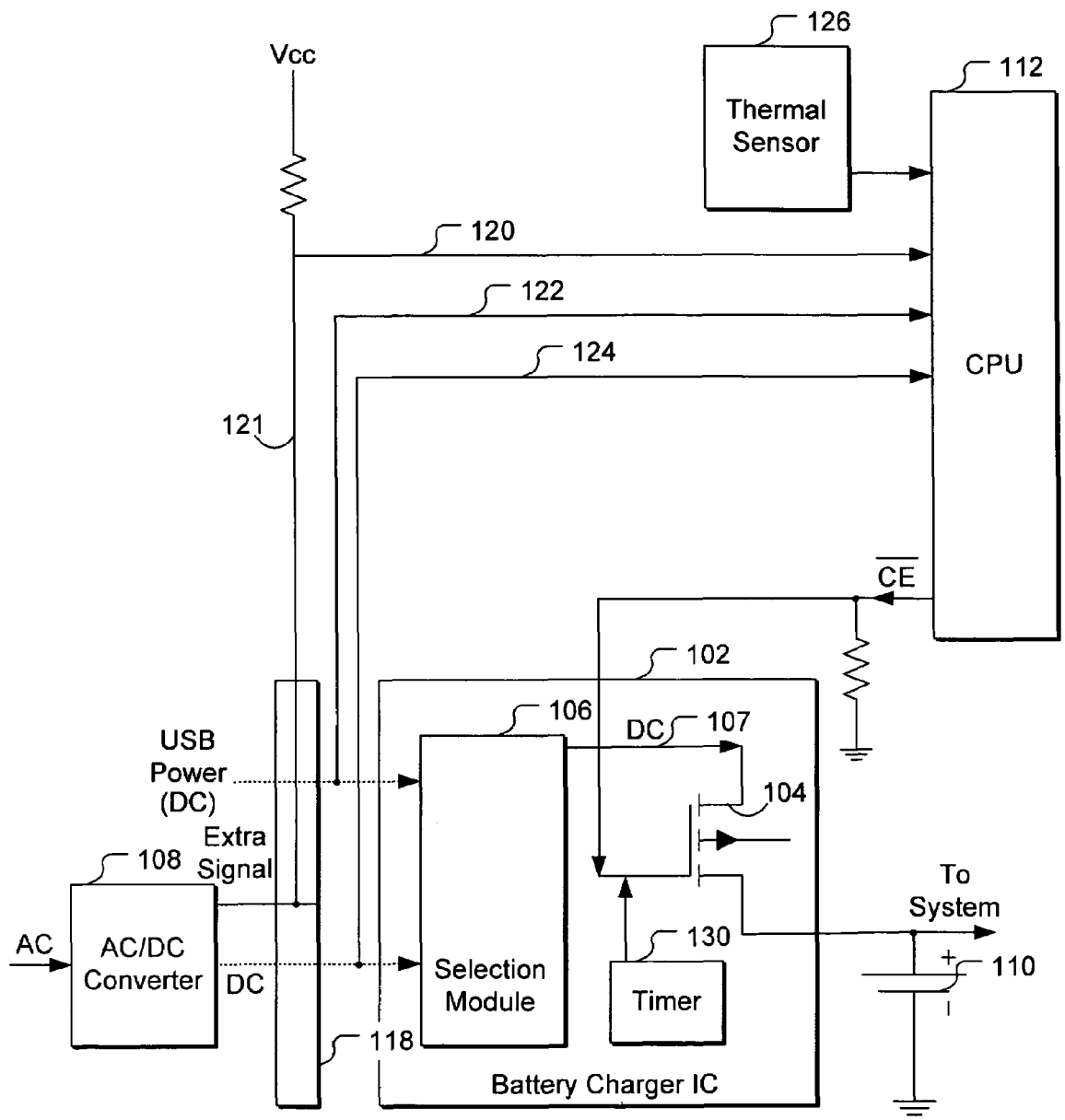
FIG. 1 is a simplified diagram of battery charging circuitry, according to one embodiment of the present invention.

FIG. 1 is a simplified diagram of battery charging circuitry, according to one embodiment of the present invention. The battery charging circuitry includes a battery charger IC 102 and a central processing unit (CPU) 112 (which can be part of the system that the battery 110 powers) to charge the battery 110. The battery 110 is for powering a battery-operated system, such as a laptop computer, a cellular telephone, wireless telephone, a personal digital assistant (PDA), a media player, a game device, or other types of portable electronic devices.

The battery charger IC 102 receives DC voltage from a DC power source and regulates the charging of the battery 110 from the DC power source. One example of a battery charger IC 102 is the battery charger IC with the part number BQ24022 marketed by Texas Instruments Incorporated of Dallas, Tex. In the embodiment shown in FIG. 1, the battery charger IC 102 receives DC power 124 provided by an AC-DC power converter 108, or DC power 122 provided by a USB (Universal Serial Bus) power source (not shown), through a universal interface 118. Examples of the AC/DC power converter 108 are a 500 mA wall adaptor or a 1000 mA wall adaptor (e.g., that connects to a 110-120 volt or 220-240 volt electrical outlet). Examples of a USB power source are a 100 mA USB power source or a 500 mA USB power source. A USB power source can provide 100 mA in normal conditions, and can also provide 500 mA if the USB power source negotiates with the computer to which the USB cable is connected through USB driver software. Other examples of a DC power source may include an IEEE 1394 cable.

The modulation charging method as will be explained below is used typically when the power source is a high current power source such as a 1000 mA wall adaptor. With lower current power sources, the thermal emission caused by the switch 104 is not as high, and thus, the modulation charging method may not be needed. Hence, the modulation charging method may not be used with the USB power source because the USB power source is typically a low current power source. Nevertheless, it should be understood by those skilled in the art that the principles of the present invention may be applicable to lower current power sources when thermal emission issues are present.

For ease of discussion, the example embodiment discussed herein will be with respect to a 1000 mA wall adaptor. In one embodiment, the 1000 mA wall adaptor has an additional pin that connects to the universal interface 118 to provide an extra signal 121 indicating the connection of a high current AC/DC converter power source. The signal 120 may be provided to the CPU 112 so that the CPU 112 can determine whether the connected power source is a high current power source and the modulation charging method should be used. In the embodiment shown in FIG. 1, a high current power source causes a low state of the extra signal 121, which in turn causes a high state of the signal 120 that indicates to the CPU 112 that the connected power source is a high current power source and that the modulation charging method is to be used. In other words, the signal 120 is active low. The CPU 112 can also determine the existence of an AC/DC power source 108 through the signal 124. For example, a high state in signal 124 with a high state in signal 120 indicates to the CPU 112 that a high current AC/DC power converter is connected and that the modulation charging method is to be used. A high state in signal 124 with low state in signal 120 indicates to the CPU 112 that a low current AC/DC power converter is connected and that the modulation charging method need not be used. The CPU 112 can also determine the existence of a USB power source by a high state of the signal 122, in which case the modulation charging method is not used.

The selection module 106 selects either the DC voltage 124 from the AC/DC power converter 108 or the DC voltage 122 from the USB power source based on a set of predetermined rules. For example, the selection module 106 may select the DC voltage 124 whenever the DC voltage 124 exists regardless of whether the DC voltage 122 exists. In response to the chip enable (~CE) signal from the CPU 112, the switch 104 couples the DC power to the battery 110 to charge the battery 110 or decouples the DC power from the battery 110 so as not to charge the battery. The chip enable (~CE) signal is active low, in the sense that the switch 104 is on when the chip enable (~CE) signal is in a low state and the switch 104 is off when the chip enable (~CE) signal is in a high state.

In one embodiment, the switch 104 is a MOSFET (Metal-Oxide-Silicon Field Effect Transistor) that has a small on-resistance, e.g., 0.2 ohm. However, if the current drawn from the AC/DC power converter 108 is large, this small resistance may still generate a large amount of heat and thus cause thermal emission. To prevent this from happening, the battery charging circuitry of the present invention modulates the chip enable (~CE) signal, such that the chip enable (~CE) signal is periodic and in each period it includes two states, a low state and a high state.

Figure 2:
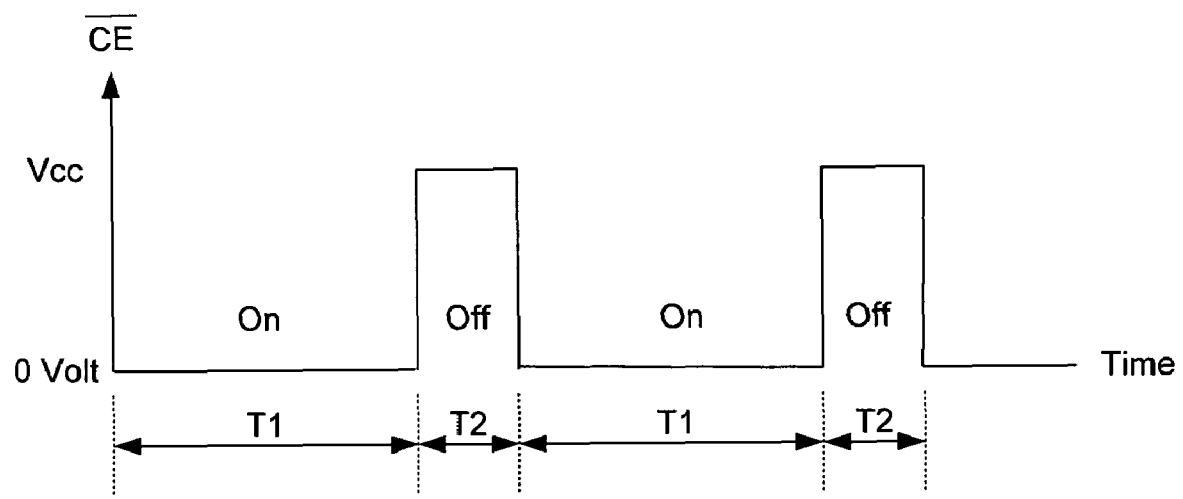
FIG. 2 is a timing diagram illustrating the chip enable signal controlling the switch in the battery charging circuitry of FIG. 1, according to one embodiment of the present invention.

FIG. 2 is a timing diagram illustrating the chip enable signal (~CE) controlling the switch 104 in the battery charging circuitry of FIG. 1, according to one embodiment of the present invention. The chip enable (~CE) signal is periodic with a period of T1+T2. In each period, the chip enable (~CE) signal is in a low state during the first duration of T1 and in a high state during the second duration of T2. The switch 104 is on during the duration T1 and off during the duration T2.

The duty cycle of the chip enable (~CE) signal is defined as $T1/(T1+T2) \times 100\%$. In one embodiment, T1 is 15 minutes and T2 is 5 minutes, such that the duty cycle is 75%. Since the chip enable (~CE) signal is modulated as shown in FIG. 2, the switch 104 is also turned on and off periodically according to the modulated chip enable (~CE) signal. While the switch 104 is turned off during the second duration T2, the battery 110 is not coupled to the power source, and as such, no current flows through the switch 104. Therefore, the amount of thermal emission caused by resistance of the switch 104 is significantly reduced and the average temperature within the battery-operated system is lowered. Note that the duty cycle and/or the times T1 and T2 may be adjusted based on a variety of factors, such as the desired battery charging time, the battery characteristics in response to the modulation charging, and the desired thermal profile of the battery-powered system.

The modulation charging method of the present invention can also solve additional problems associated with conventional battery charger ICs. Some conventional battery charger ICs are designed to shut down completely after being on for a long time (a time-out period), e.g., 5 hours. The turn-on time is tracked by an optional timer 130. Shutting down the battery charger IC after the time-out period may cause the battery 110 to drain, because the power source is still connected to the universal interface 118 and thus the CPU 112 may consider the battery 104 still being charged and keep running even after the time-out period.

In order to prevent the battery charger IC from shutting down after the time-out period, the modulation charging method of the present invention can be used to modulate the periodic chip enable signal (~CE) with a very large duty cycle (e.g., T1 is 4 hours and T2 is 4 seconds). In this manner, the timer 130 tracking the on-time during which the battery charger IC 112 is on will be reset, and the battery charger IC 112 will not shut down for another full time-out period. This process may be referred to as "restarting modulation" herein.

In one embodiment, the battery charging circuitry of the present invention charges the battery 110 using the modulation charging method according to the present invention, depending upon the type of charging power source and the state of the battery-powered system as follows:

(i) When the charging power source is, e.g., a 1000 mA AC/DC adaptor, the modulation charging method is used when the connected battery-operated system is in the "on" mode but is not used when the battery-operated system is in the "idle" mode or "sleep" mode. The restarting modulation method may be optionally used when the battery-operated system is in the "idle" mode or "sleep" mode.

(ii) When the charging power source is, e.g., a 500 mA AC/DC adaptor, the modulation charging method is not used when the battery-operated system is in the "on" mode, "idle" mode, or "sleep" mode. The restarting modulation method may be optionally used when the battery-operated system is in the "on" mode, "idle" mode, or "sleep".

(iii) When the charging power source is, e.g., a USB cable with 500 mA charge, the modulation charging method is not used when the battery-operated system is in the "on" mode, "idle" mode, or "sleep" mode. The restarting modulation method may be optionally used when the battery-operated system is in the "on" mode, "idle" mode, or "sleep".

(iv) When the charging power source is, e.g., a USB cable with 100 mA charge, the modulation charging method is not used when the battery-operated system is in the "on" mode, "idle" mode, or "sleep" mode. The restarting modulation method may be optionally used when the battery-operated system is in the "on" mode, "idle" mode, or "sleep".

Note that the modulation charging method need not be used while the battery-operated system connected to the battery 110 is in "idle" mode or "sleep" mode. In "sleep" mode, the system's display and processor are typically off and only the non-volatile memory (e.g., SDRAM) may be on, consuming a very small amount of current (e.g., less than 1 mA). The "sleep" mode may be triggered when the power-off button (not shown) of the battery-operated system is pressed or when a time-out occurs. In "on" mode, the battery-operated system is running with the display and the processor on. The battery-operated system may go back to "on" mode when, for example, a "power-on" button is pressed, a cable is plugged into the battery-operated system, or wireless communication activity occurs in the battery-operated system. "Idle" mode can be defined as a mode consuming power in a range between the amount of power consumption in the "on" or "idle" mode with certain triggering events, and is optional. In either the "idle" mode or "sleep" mode, the battery power is not consumed rapidly and the battery 110 does not draw large amounts of current to be charged rapidly. In addition, other components of the battery-powered system, such as the display screen and other integrated circuits (e.g., processors, wireless communication systems) also generate less or no heat in "idle" or "sleep" mode. Thus, there is less concern for thermal emission in "idle" or "sleep" mode and the modulation charging method is not needed. In still another embodiment of the present invention, the duty cycle of the periodic chip enable signal (~CE) may be adjusted in "idle" or "sleep" mode, rather than disabling the generation of the periodic control signal (~CE). For example, the duty cycle of the periodic chip enable signal (~CE) may be adjusted to be large in the "on" mode, while the duty cycle of the periodic chip enable signal (~CE) may be adjusted to be small in the "idle" or "sleep" mode.

In another embodiment of the present invention, the battery charging circuitry optionally includes a thermal sensor 126 that senses the temperature within the enclosure of the battery-powered system connected to the battery charging circuitry. The temperature information is provided to the CPU 112. The CPU 112 reduces the duty cycle of the chip enable (~CE) signal if the temperature is high, and vice versa, so that the average amount of thermal emission by the battery charger IC 102 is maintained low. In still another embodiment, the CPU 112 may disable the modulation charging altogether if the temperature is low.

Figure 3:
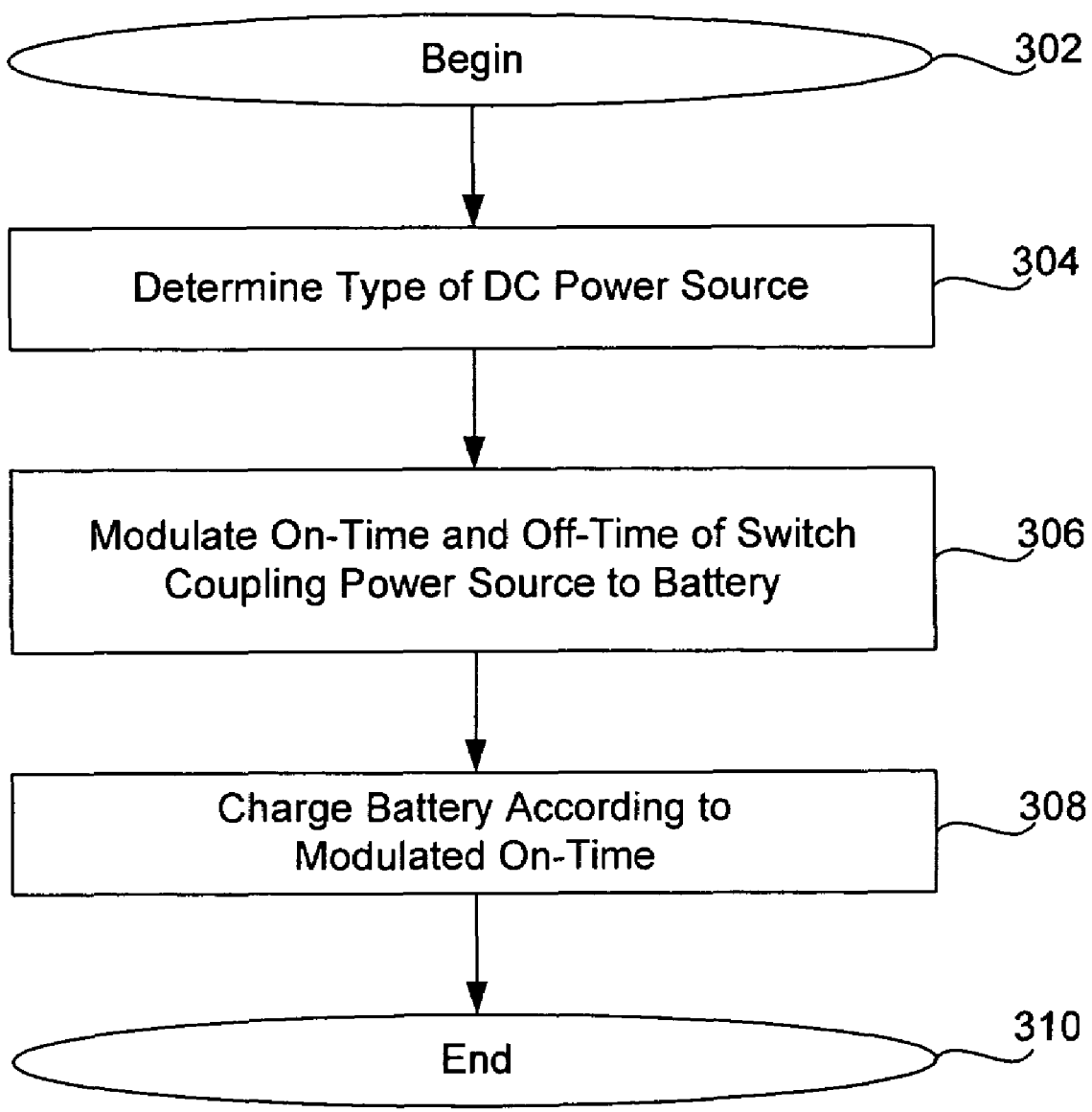
FIG. 3 is a flow chart illustrating a method of charging a battery, according to one embodiment of the present invention.

FIG. 3 is a flow chart illustrating a method of charging a battery, according to one embodiment of the present invention. As the process begins 302, the battery charging circuitry determines 304 the type of DC power source connected to the battery charging circuitry. If the DC power source is a high current power source (e.g., provided current is larger than a predetermined threshold), the battery charging circuitry modulates the on-times and off-times of the switch 104 in the battery charger IC 102 coupling the power source to the battery 110 by modulating the duty cycle of a periodic control signal that controls the turning on and off the switch 104. The battery 110 is charged 308 according to the modulated on-times and off-times of the switch 104. Therefore, the average amount of heat generated by the on-resistance of the switch 104 is reduced, thereby preventing excessive thermal emission in the battery-operated system with which the battery charging circuitry is used.

Upon reading this disclosure, those of skill in the art will appreciate still additional alternative structural and functional designs for a system and a process for battery charging through the disclosed principles of the present invention. For example, the switch in the battery charger IC can be any type of switch, such as a MOSFET switch or a bipolar transistor switch. The DC power source may also be any type of power source, such as an AC/DC power converter, a USB interface, or any other type. The particular arrangement of the battery charging circuitry is for illustration only, and can be modified. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of charging a battery using a plurality types of power sources, comprising:
providing a first current from a first type of power source to the battery via a path extending from a selection module to the battery responsive to the selection module coupling the first type of power source to the battery;
providing a second current from a second type of power source to the battery via the same path extending from the selection module to the battery responsive to the selection module coupling the second type of power source to the battery;
determining whether a power source coupled to the path is of the first type or of the second type;
generating a periodic control signal including a plurality of periods, wherein each period includes a first duration during which the control signal is in a first state and a second duration during which the control signal is in a second state;
turning a switch on and off in accordance with the periodic control signal, the switch being turned on during the first duration to couple the power source to the battery and being turned off during the second duration to decouple the power source from the battery;
sensing a temperature of an apparatus powered by the battery;
responsive to the sensed temperature being in a first temperature state, decreasing the first duration relative to the second duration; and
responsive to the sensed temperature being in a second temperature state, increasing the first duration relative to the second duration.

2. The method of claim 1, further comprising:
responsive to determining that the power source is of a type providing current exceeding a predetermined threshold, turning the switch on and off based on the periodic control signal.

3. The method of claim 2, wherein determining whether the power source coupled to the path is of the first type or of the second type comprises:
determining the existence of a signal indicative of the type of the power source.

4. The method of claim 3, wherein the signal indicative of the type of the power source is provided if a physical pin indicative of the type of the power source exists on the power source.

5. The method of claim 1, wherein a timer tracks an amount of time during which the switch is on, the timer being reset during the second duration.

6. The method of claim 1, further comprising:
responsive to determining a type of the power source, selecting a first charging path for coupling the switch to a first type of power source or a second charging path for coupling the switch to a second type of power source.

7. The method of claim 1, further comprising:
responsive to determining that a device powered by the battery is in a first operational mode, generating the periodic control signal; and
responsive to determining that the device powered by the battery is in a second operational mode, disabling generating the periodic control signal.

8. The method of claim 1, further comprising:
responsive to determining that a device powered by the battery is in a first operational mode, increasing or decreasing the first duration relative to the second duration to obtain a first duty cycle of the periodic control signal; and
responsive to determining that a device powered by the battery is in a second operational mode, increasing or decreasing the first duration relative to the second duration to obtain a second duty cycle of the periodic control signal.

9. A circuitry for charging a battery using a plurality types of power sources, comprising:
a selection module selectively coupling a first type of power source or a second type of power source to the battery;
a common path extending between the selection module and the battery, the common path providing current from the first type of power source or the second type of power source to the battery;
a switch in the common path for coupling or decoupling the common path to the battery;
a sensor for sensing a temperature of an apparatus powered by the battery; and
a controller determining whether a power source coupled to the path is of the first type or the second type, the controller generating a periodic control signal including a plurality of periods, each period including a first duration during which the control signal is in a first state and a second duration during which the control signal is in a second state, the switch being turned on during the first duration to couple the power source to the battery and being turned off during the second duration to decouple the power source from the battery, the controller decreasing the first duration relative to the second duration responsive to the sensed temperature being in a first temperature state, the controller increasing the first duration relative to the second duration responsive to the sensed temperature being in a second temperature state.

10. The circuitry of claim 9, wherein the controller generates the control signal responsive to determining that the power source is of a type providing current exceeding a predetermined threshold.

11. The circuitry of claim 10, wherein the controller determines that the power source is of a type providing current exceeding a predetermined threshold by determining the existence of a signal indicative of the type of the power source.

12. The circuitry of claim 11, wherein the power source includes a physical pin indicative of the type of the power source.

13. The circuitry of claim 9, further comprising a timer tracking an amount of time during which the switch is on, the timer being reset during the second duration.

14. The circuitry of claim 9, wherein:
responsive to determining that a device powered by the battery is in a first operational mode, the controller generates the periodic control signal; and
responsive to determining that the device powered by the battery is in a second operational mode, the controller disables generating the periodic control signal.

15. The circuitry of claim 9, wherein:
responsive to determining that a device powered by the battery is in a first operational mode, the controller increases or decreases the first duration relative to the second duration to obtain a first duty cycle of the periodic control signal; and
responsive to determining that a device powered by the battery is in a second operational mode, the controller increases or decreases the first duration relative to the second duration to obtain a second duty cycle of the periodic control signal.

16. A circuitry for charging a battery using a plurality types of power sources, comprising:
a selection module selectively coupling a first type of power source or a second type of power source to the battery;
a common path extending between the selection module and the battery, the common path providing current from the first type of power source or the second type of power source to the battery;
switching means in the common path for coupling or decoupling the common path to the battery;
sensing means for sensing a temperature of an apparatus powered by the battery; and
controlling means for determining whether a power source coupled to the path is of the first type or of the second type, the controller means generating a periodic control signal including a plurality of periods, each period including a first duration during which the control signal is in a first state and a second duration during which the control signal is in a second state, the switching means being turned on during the first duration to couple the power source to the battery and being turned off during the second duration to decouple the power source from the battery, the controlling means decreasing the first duration relative to the second duration responsive to the sensed temperature being in a first temperature state, the controlling means increasing the first duration relative to the second duration responsive to the sensed temperature being in a second temperature state.

17. The circuitry of claim 16, wherein the controlling means generates the control signal responsive to determining that the power source is of a type providing current exceeding a predetermined threshold.

18. The circuitry of claim 17, wherein the controlling means determines that the power source is of a type providing current exceeding a predetermined threshold by determining the existence of a signal indicative of the type of the power source.

19. The circuitry of claim 16, further comprising timer means for tracking an amount of time during which the switching means is on, the timer means being reset during the second duration.

* * * * *